Oct. 5, 1954
M. B. HALL
APPARATUS FOR FORMING AND APPLYING
HINGES TO RECORD CARDS
2,690,781
Filed June 15, 1949
5 Sheets-Sheet 1
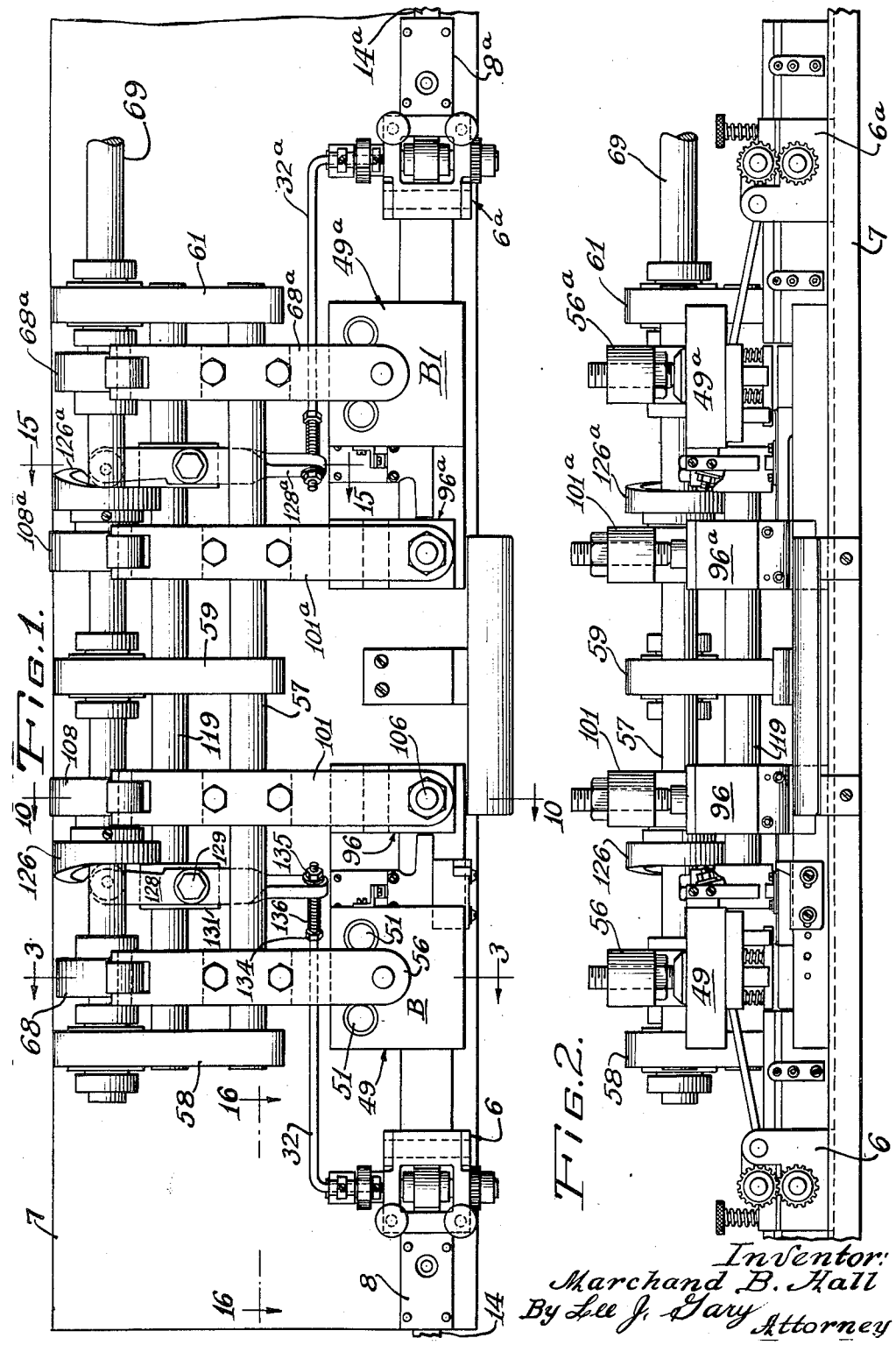
Inventor:
Marchand B. Hall
By Lee J. Gary
Attorney Oct. 5, 1954
M. B. HALL
2,690,781
APPARATUS FOR FORMING AND APPLYING HINGES TO RECORD CARDS
Filed June 15, 1949
5 Sheets-Sheet 2
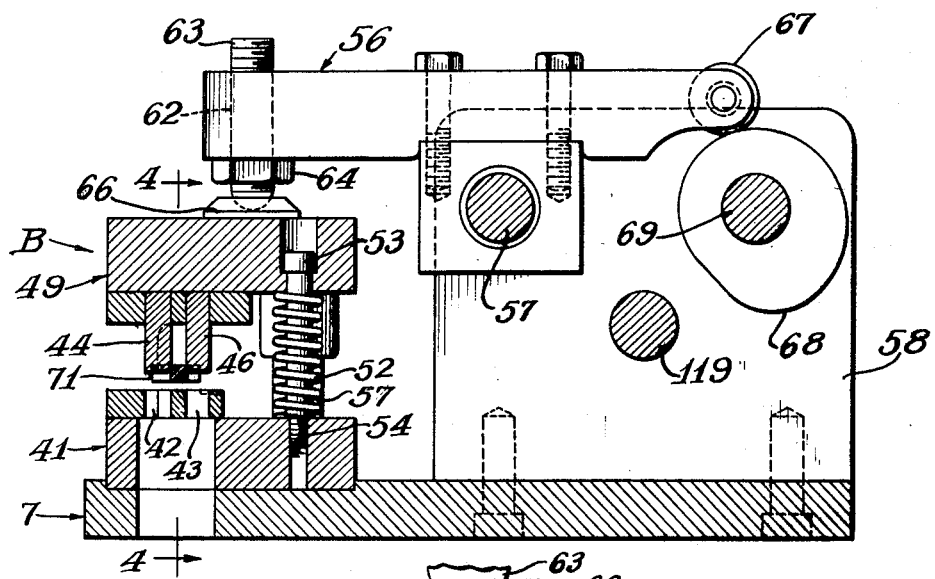
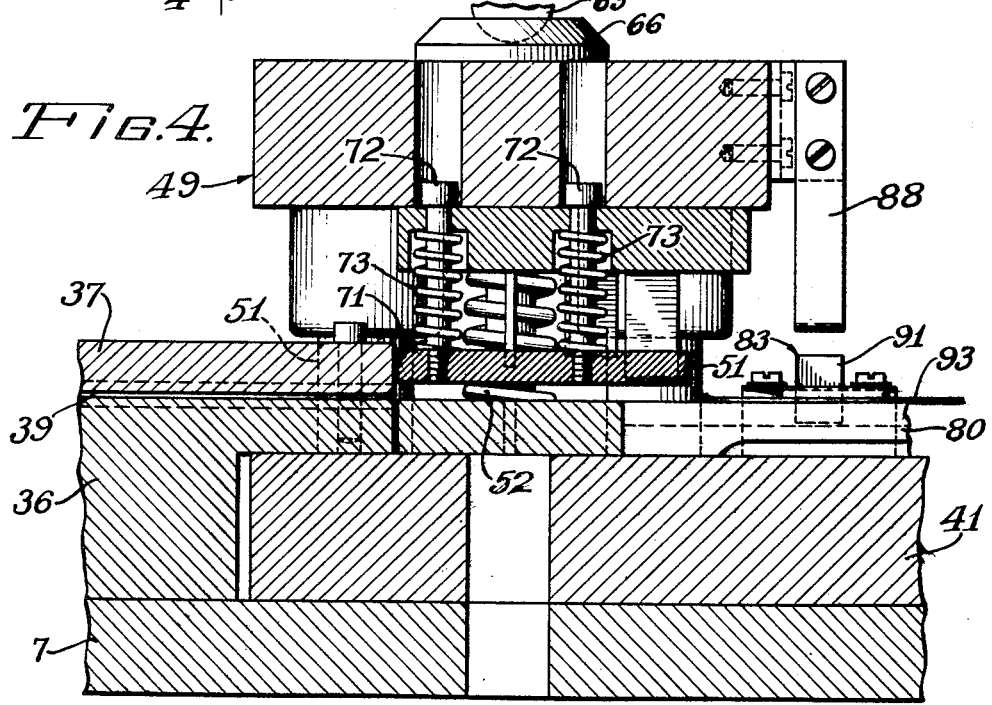
Inventor:
Marchand B. Hall
By Lee J. Gary
Attorney

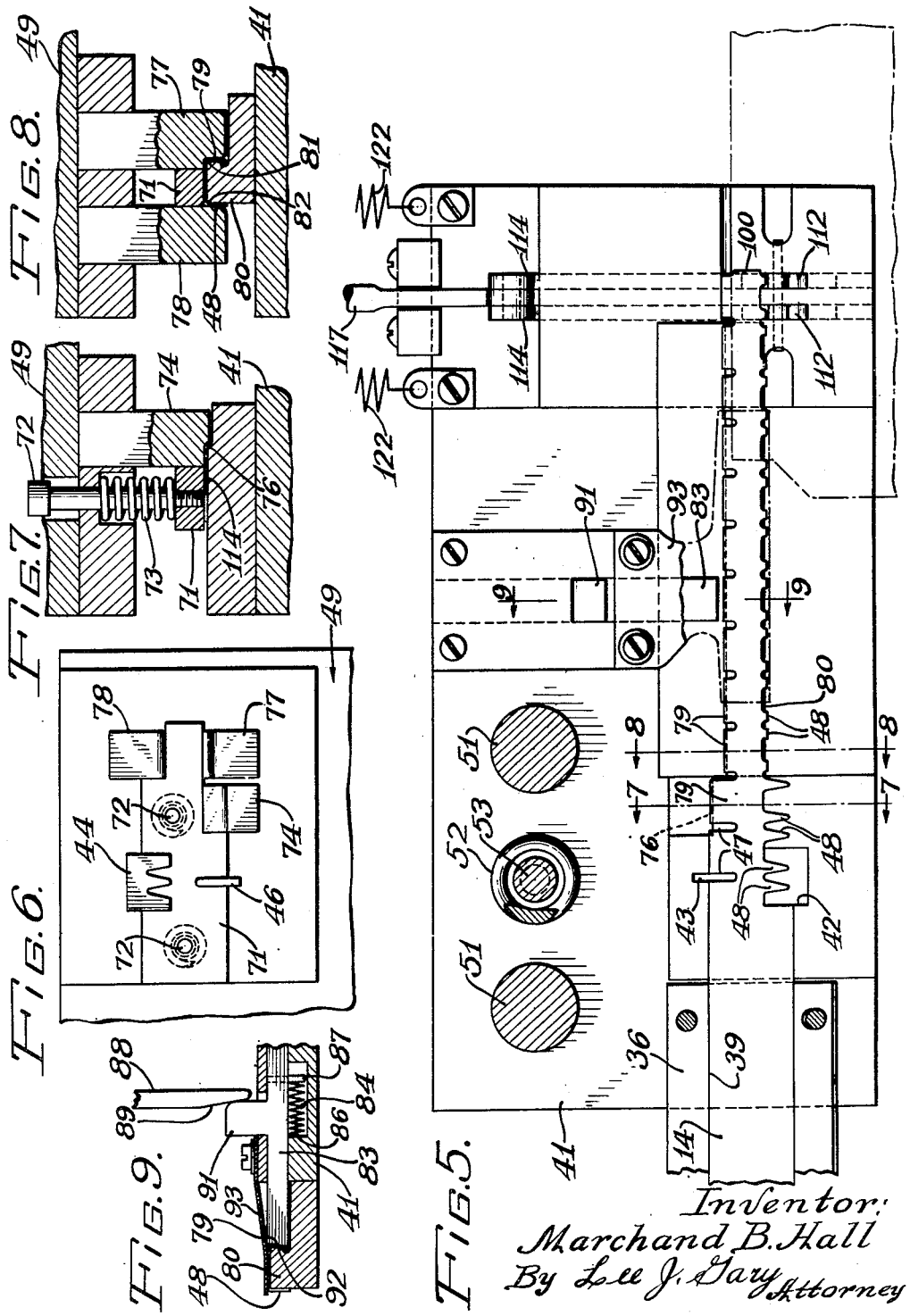

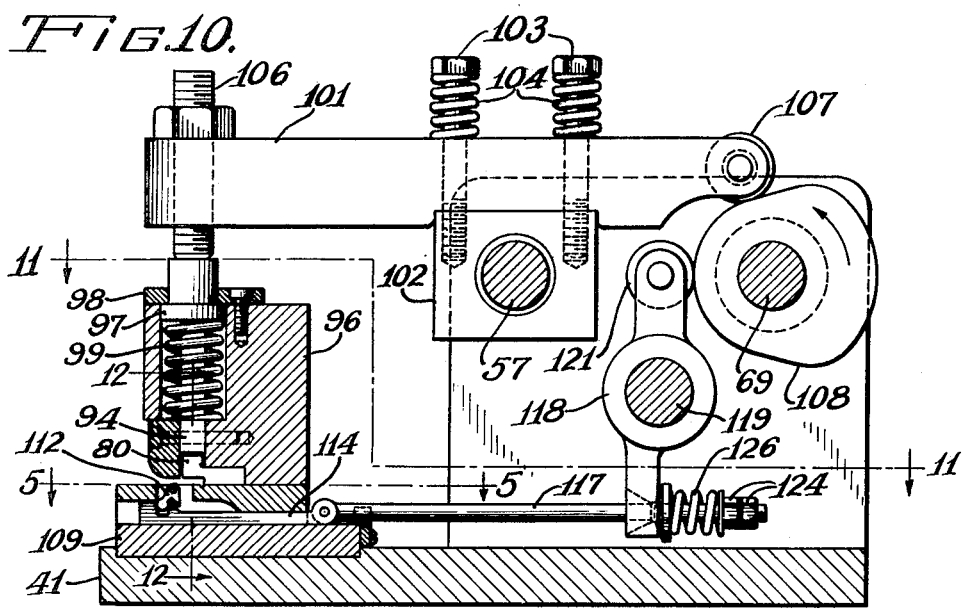
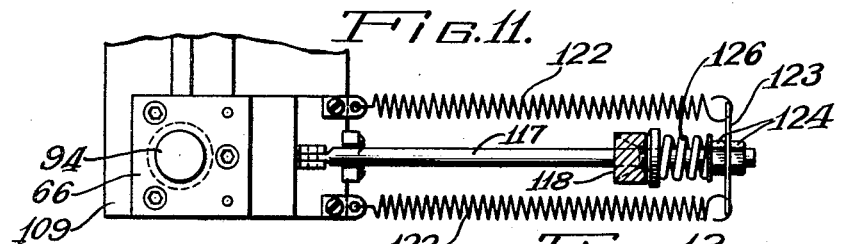
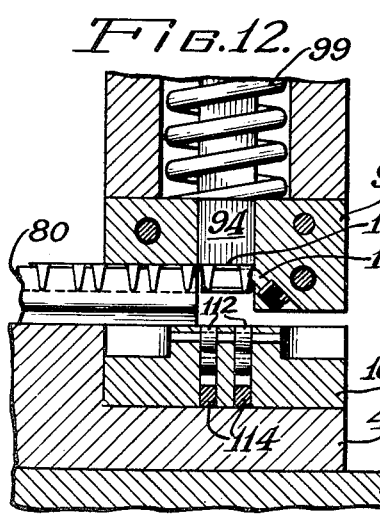
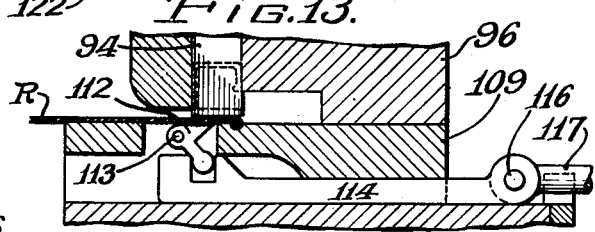
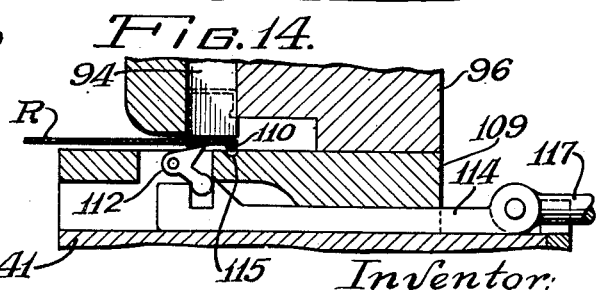

Oct. 5, 1954
M. B. HALL
2,690,781
APPARATUS FOR FORMING AND APPLYING HINGES TO RECORD CARDS
Filed June 15, 1949
5 Sheets-Sheet 5
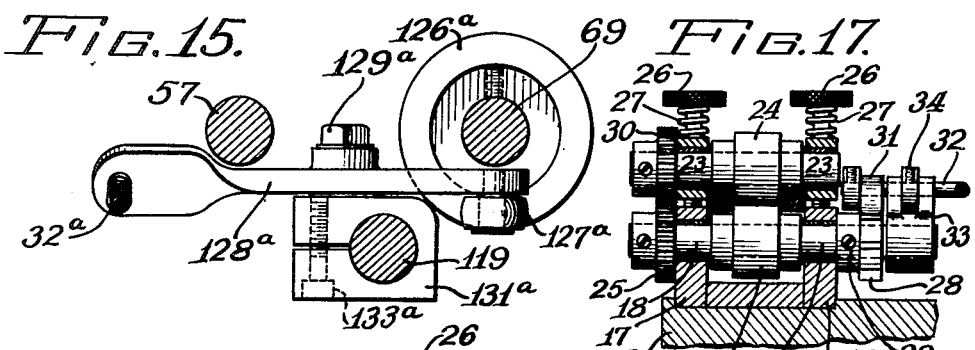
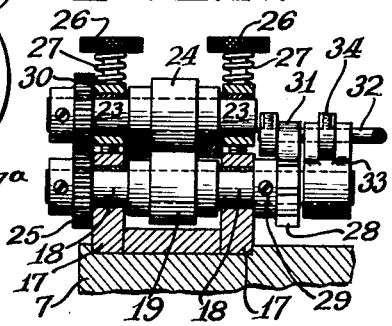
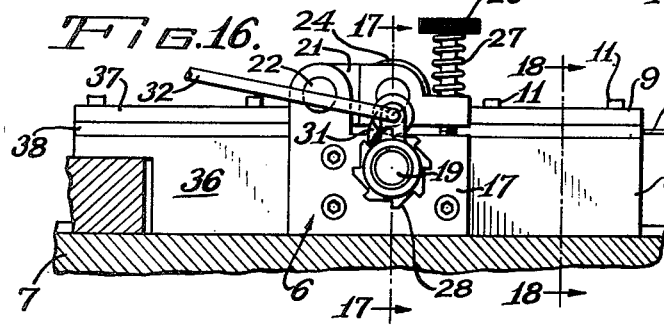
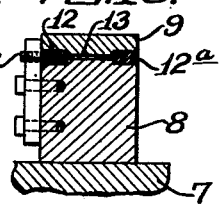
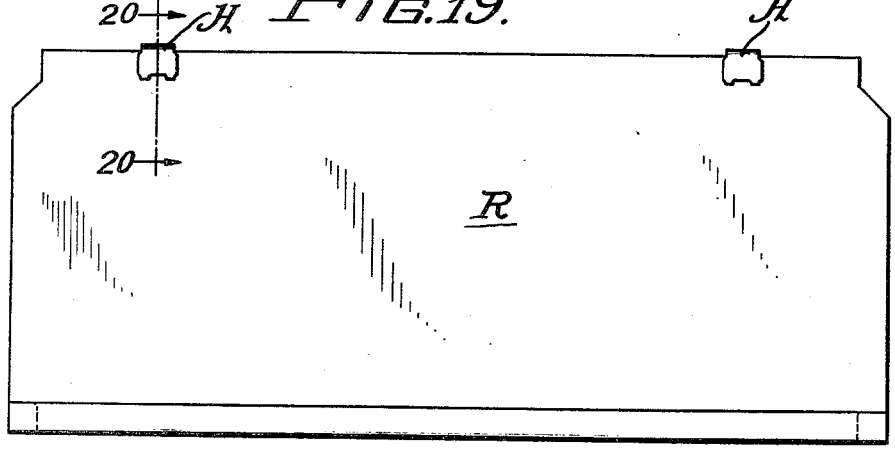
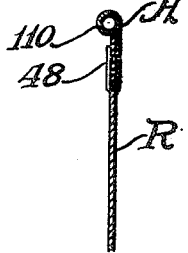
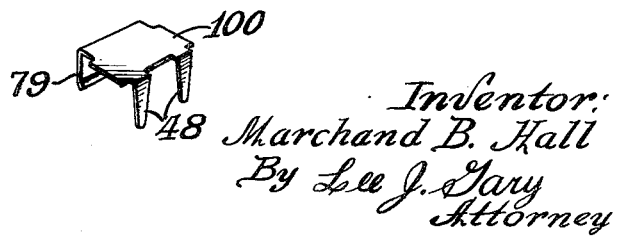
Inventor:
Marchand B. Hall
By Lee J. Gary
Attorney Patented Oct. 5, 1954

2,690,781

UNITED STATES PATENT OFFICE 2,690,781

APPARATUS FOR FORMING AND APPLYING HINGES TO RECORD CARDS

Marchand Blanchard Hall, Chicago, Ill., assignor to Acme Visible Records, Inc., Chicago, Ill., a corporation of Delaware Application June 15, 1949, Serial No. 99,314

7 Claims. (Cl. 153—1)

This invention relates to visible index equipment of the type embodying a plurality of record cards, or card pockets, adapted to be arranged in overlapping relation and mounted for pivotal movement by means of hinge members attached to the upper edges of the record cards or card holders. More particularly, this invention relates to improvements in method and apparatus for forming and applying the hinge members to record cards or card pockets.

It has heretofore been the practice to blank and form individual hinge members from strip material and then manually apply the hinge members to the record cards. The present invention contemplates the provision of a method and apparatus for progressively feeding two strips of sheet metal toward each other and to blank and form the strips to provide two chains of connected hinge members for stapling to the upper opposite corners of a record card.

This invention further contemplates the provision of a hinge forming apparatus which is relatively simple and inexpensive in construction and operation and which will not readily get out of order.

This invention embodies other novel features, details of construction and arrangement of parts which are hereinafter set forth in the specification and claims, and illustrated in the accompanying drawings, wherein:

Fig. 1 is a top plan view illustrating the preferred construction of the apparatus for forming and applying hinges to record cards.

Fig. 2 is a front elevational view of same.

Fig. 3 is a transverse sectional view taken along the line 3—3 of Fig. 1.

Fig. 4 is a detail sectional view taken along the line 4—4 of Fig. 3.

Fig. 5 is a fragmentary sectional view taken along the line 5—5 of Fig. 10, illustrating the manner of progressively blanking and forming a strip of sheet metal to provide a chain of connected hinge members.

Fig. 6 is a bottom plan view illustrating the blanking and forming punches and stripper plate.

Fig. 7 is a fragmentary sectional view taken along the line 7—7 of Fig. 5.

Fig. 8 is a fragmentary sectional view taken along the line 8—8 of Fig. 5.

Fig. 9 is a fragmentary sectional view taken along the line 9—9 of Fig. 5.

Fig. 10 is a transverse sectional view taken along the line 10—10 of Fig. 1.

Fig. 11 is a fragmentary sectional view taken along the line 11—11 of Fig. 10.

Fig. 12 is a fragmentary sectional view taken along the line 12—12 of Fig. 10.

Fig. 13 is a fragmentary sectional view corresponding to Fig. 10 to illustrate the position of parts in applying the hinge member to a record card.

Fig. 14 is a fragmentary sectional view, corresponding to Figs. 10 and 13, illustrating the position of parts in stripping the record card and hinge member from the die portion of the apparatus.

Fig. 15 is a fragmentary sectional view taken along the line 15—15 of Fig. 1.

Fig. 16 is a fragmentary sectional view taken along the line 16—16 of Fig. 1.

Fig. 17 is a fragmentary sectional view taken along the line 17—17 of Fig. 16.

Fig. 18 is a detail sectional view taken along the line 18—18 of Fig. 16.

Fig. 19 is a plan view illustrating a record card having hinge members applied to its upper edge.

Fig. 20 is a fragmentary sectional view taken along the line 20—20 of Fig. 19.

Fig. 21 is a detail perspective view illustrating the form of the hinge member prior to its attachment to a record card.

Referring now to the drawings for a better understanding of this invention, the apparatus for forming and applying hinges to record cards and the like is shown as comprising a pair of strip feed mechanisms 6—6a mounted in spaced alignment upon a base 7. As the feed mechanisms 6—6a are similar in construction and operation, the following description of feed mechanism 6 shall also apply to the feed mechanism 6a.

Feed mechanism

Referring now more particularly to Figs. 1, 16, 17 and 18 in the drawings, the strip feed mechanism is shown as comprising a guide block 8 provided with a removable cover 9 which is secured to the block by means of cap screws 11. Spacing bars 12—12a are interposed between the block 8 and its cover 9 to define therewith an elongated passageway 13 to slidably receive and guide a strip of metal 14. The spacing bar 12 is adapted to be adjustably positioned with respect to its companion bar 12a by means of adjustment screws 16. A pair of roll supporting plates 17—17 are secured in spaced parallel relation upon the base 7 and provided with bearing apertures to receive the journal portions 18—18 of a lower feed roll 19. A roll supporting arm 21 is pivotally connected at 22 to the roll supporting plates 17—17 and is provided with bearing apertures to receive journal portions 23—23 of an upper feed roll 24. The outer end of the roll supporting arm 21 is formed with a pair of apertures to receive adjustment screws 26—26 which are mounted in threaded apertures provided in plates 17—17.

Compression springs 27 are provided on the adjustment screws 26—26 to yieldably resist upward movement of the roll supporting arm 21. A ratchet 28 is secured to the lower feed roll 19 by means of a set screw 29 and is actuated by means of a pawl 31 journaled on the inner end of an actuating rod 32. The actuating rod 32 is journaled in apertures provided in a bifurcated arm 33 journaled on the bearing portion 18 of the lower roll 19. A locking collar 34 is secured to the actuating rod 32 to hold the latter against lateral displacement. A guide block 36, cover 37 and spacing bars 38—38a, similar to the guide block 8, cover 9 and spacing bars 12—12a, are provided at the exist side of the feed rolls 19 and 24 to define a passageway to receive and guide the strip material 14.

Blanking and forming mechanism

The strip material 14 passes through the passageway 39, defined by the block 36, cover 37 and spacing bars 38—38a, into a blanking and forming mechanism generally indicated at B. The blanking and forming mechanism B is shown as comprising a die block 41 supported upon the base 7 and formed with apertures 42 and 43 to receive punches 44 and 46, respectively. As illustrated in Figs. 5 and 6, the punch 46 acts to cut transversely extending slits 47 at spaced intervals along one side of the strip 14; while the punch 44 acts to cut away a portion of the other side of the strip 14 to define prong members 48.

The punches 44 and 46 are mounted upon the underside of a punch block 49 which, in turn, is mounted for vertical reciprocative movement along guide rods 51—51 which are mounted upon and extend upwardly from the die block 41. A compression spring 52 is interposed between the die block 41 and the punch block 49 to yieldably resist downward movement of the punch block, each of said springs being secured against displacement by means of cap screws 53 which are inserted downwardly through apertures provided in the punch block for threaded engagement at 54 in the die block. A punch block actuating arm 56 is journaled intermediate its ends upon a shaft 57 secured in fixed position upon supporting brackets or bosses 58, 59 and 61 provided on the base 7. The outer end of the arm 56 is threaded at 62 to receive an adjustment screw 63 which is secured in fixed position by means of a lock nut 64. The inner end of the adjustment screw 63 is rounded for engagement in a recess formed in a boss 66 provided on the punch block 49. A roller 67 is journaled on the inner end of the arm 56 for engagement by a cam 68 secured to a cam shaft 69. The cam shaft 69 is journaled in the brackets 58, 59 and 61 and is adapted to be driven from any suitable source of power through a single revolution clutch (not shown). A stripper plate 71 is mounted in spaced relation to the underside of the punch block 49 by means of cap screws 72—72, and compression springs 73—73 are mounted upon the cap screws to yieldably resist movement of the stripper plate 71 toward the punch block.

A forming punch 74 is mounted on the underside of the punch block 49 to bend the edge of the strip 14 downwardly around the shoulder 76 provided on the die block 41. A pair of forming punches 77 and 78 are also mounted on the underside of the punch block 49, the forming punch 77 being disposed to bend the tongue portions 79 of the strip 14 downwardly around a shoulder 81 of a track 80, and the forming punch 78 acting to bend the prongs 48 downwardly around a shoulder 82, as illustrated in Fig. 8.

A forming bar 83 is mounted for reciprocative movement on the die block 41 and is normally urged rearwardly by means of a compression spring 84 acting between a shoulder 86 on the die block and a pin 87 mounted on the forming bar. An actuating bar 88 is mounted on the punch block 49 and is provided with a cam surface 89 for engagement against a head 91 provided on the forming bar 83. During downward movement of the actuating bar 88, it acts to move the forming bar 83 forward to bend the tongues 79 on the strip 14 inwardly against the shoulder 92 provided on the track 80. A flat plate spring 93 is mounted on the die block 41 to prevent upward displacement of the strip 14 from the track 80 during operation of the forming bar 83.

Hinge forming and applying mechanism

Referring now more particularly to Figs. 5 and 10 through 14 in the drawings, the hinge forming and applying mechanism is shown as comprising a shearing and forming punch 94 mounted for vertical reciprocative movement within a housing 96. The punch 94 is provided with an abutment shoulder 97 which is normally held in engagement against a plate 98 by means of a compression spring 99. An actuating arm 101 is connected intermediate its ends to a bearing block 102 by means of cap screws 103. The cap screws 103 are slidably mounted in apertures provided in the actuating arm 101 and act through compression springs 104 to yieldably resist relative movement between the actuating arm and the bearing block. The bearing block 102 is journaled on the shaft 57. The outer end of the actuating arm 101 is provided with an adjustment screw 106 which engages the upper end of the plunger 94. A roller 107 is journaled on the inner end of the actuating arm 101 for engagement against a cam 108 secured to the cam shaft 69.

During downward movement of the plunger 94, a hinge element 100 is sheared from the end of the strip 14 by movement of the lower face of the plunger past the adjacent edge of the track 80. Further downward movement of the plunger 94 causes the prongs 48 of the hinge element 100 to pierce a record card R positioned upon a die block 109. As the plunger 94 reaches the end of its downward stroke, it coacts with the die block 109 to form the tongue portion 79 of the hinge element 100 into a loop 110. A spring-pressed plunger 111 is mounted for engagement under the forward edge of the strip 14 to support the end of the strip during the shearing of a hinge element from the strip. As the punch moves downwardly past the shearing edge of the track 80, the plunger 111 is forced rearwardly and does not return to its forward position until the punch has returned to its starting position.

After the hinge element 100 has been applied to a record card R in the manner thus shown and described, the prongs 48 are bent upwardly against the underside of the record card in the manner illustrated in Fig. 13. The prong bending mechanism comprises a pair of bell crank levers pivoted for movement on a pin 113 by means of a pair of actuating rods 114. The rods 114 are mounted for sliding reciprocative movement in the die block 109 and are connected at 116 to a connecting link 117 which, in turn, is mounted within an aperture formed at one end of a rocker arm 118. The rocker arm 118 is journaled on a shaft 119 supported on the brackets 58, 59 and 61. A roller 121 is journaled on the other end of the rocker arm 118 for engagement against the cam 108. A pair of tension springs 122—122 are connected at their one ends to the die block 109 and at their other ends to a plate 123 secured to the end of the connecting link 117 by means of lock nuts 124. A compression spring 126 is interposed between the rocker arm 118 and one of the lock nuts 124. During rearward movement of the actuating rods 114, the bell crank levers 112 first act to bend the prongs 48 of a hinge element upwardly against the face of the record card R. Upon upward movement of the plunger 94, the actuating rods 114 act through the bell crank levers 112 to raise the record card and hinge above the surface of the die 109.

*Feed roll actuating mechanism*

A cam 126 is keyed to the cam shaft 69 for engagement against a roll 127 journaled on a lever 128. The lever 128 is journaled intermediate its ends upon a shoulder screw 129 which is threaded into a bearing block 131. The bearing block is clamped to a cross shaft 119 by means of locking screws 133, and the cross shaft 119 is secured in fixed position within apertures provided in the brackets 58, 59 and 61. The free end of the lever 128 is formed with an aperture to receive the end of the actuating rod 32 which is threaded to receive a pair of nuts 134 and 135. A compression spring 136 is mounted on the actuating rod 32 between the nut 134 and the lever 128.

The apparatus heretofore described, such as the feed mechanism, blanking and forming mechanism, hinge forming and applying mechanism, etc., is employed for forming and applying hinges to one corner of a record card. As illustrated in the drawings, this mechanism may be duplicated if it is desirable to simultaneously form and apply two hinges H to a record card R as illustrated in Fig. 19. This duplicated mechanism is similar in construction to the mechanism heretofore shown and described and similar numbers followed by the letter "a" have been applied to corresponding parts of the duplicated mechanism.

*Operation*

In the operation of the apparatus thus shown and described for applying hinges H to record cards R, two strips of relatively thin metal 14 and 14a are fed into opposite ends of the machine through the passageways formed in the guide blocks 8 and 8a for engagement by the feed mechanisms 6 and 6a. As the method and apparatus for forming and applying each hinge H to a record card is similar in operation and construction, the following description is limited to the method and apparatus for forming hinges from the strip 14 and for applying such hinges to one side of the record card R.

As the strip 14 passes through the passageway 13, it is engaged between the feed rolls 19 and 24 which are urged into engagement by means of compression springs 27—27 and connected for common rotational movement by means of gears 26 and 30. The feed rolls 19 and 24 are rotated to impart step-by-step movement of the strip 14 by means of the cam 126 which acts through the lever 128 and actuating rod 32 to pivot the arm 33 about the axis of the roll 19. The pawl 31 carried on the inner end of the actuating rod 32 is disposed to engage the ratchet 28 secured to the roll 19 and thus impart step-by-step rotational movement to the roll 19 and the roll 24.

During the step-by-step movement of the strip 14, the punch block 49 is moved downwardly toward the die 41 by means of the cam 68 which acts through the rocker arm 56. During downward movement of the punch block 49 the punches 44 and 46 act to blank out portions of the strip 14 to form prongs 48 and slots 47. During each downward stroke of the punch block 49, the forming punch 74 acts to bend the edge of each flange portion 79 downwardly around a shoulder 76, and forming punches 77 and 78 are disposed to bend the flanges 79 and prongs 48 downwardly from the plane of the strip. As illustrated more clearly in Figs. 4, 5 and 9, downward movement of the punch block 49 also causes the cam arm 88 to engage the reciprocable forming bar 83 to move a flange portion 79 inwardly against a shoulder 92 provided on the track 80, and it will be noted that the angle between the plane of the strip 14 and the abutment shoulder 92 is slightly less than 90°. The punch block 49 is returned to its upper position by the compression spring 52. During initial upward movement of the punch block 49, the stripper plate 71 remains in engagement with the strip 14 and thereafter is caused to move upwardly by the cap screws 72. The forming bar 83 is returned to its inoperative position by means of compression spring 84.

After the strip of metal 14 has been formed along its side edges with downturned flanges 79 and prongs 48, it is directed into the apparatus for completing the hinge forming operation and applying the hinges to record cards, as illustrated in Figs. 10 to 14 in the drawings. After each forward movement of the strip 14, the shearing and forming punch 94 is moved downwardly toward the die 109 by means of the cam 108 which acts through the rocker arm 101. During initial downward movement of the shearing and forming plunger 94, the plunger acts with the inner end of the track 80 to shear a hinge element 100 from the strip 14 and then to move the severed hinge element 100 downwardly against the surface of a record card R. During downward movement of the hinge element 100, the prongs 48 pierce the record card, and the flange portion 79 is formed into a loop 110. The cam 108 then acts through the rocker arm 118 to move the actuating bars 114 rearwardly to pivot the bell crank 112 to the position illustrated in Fig. 13. During this pivotal movement of the bell crank 112, it acts to bend the prongs 48 upwardly against the underside of the record card R.

After the hinge H has been formed and applied to the record card R, the compression spring 99 acts to return the shearing and forming punch 94 to its upper position. During initial upward movement of the punch 94, the compression spring 126 acts to impart further rearward movement of the actuating bars 114 and further pivotal movement of the bell crank levers 112 to raise the record card R and the hinge H applied thereto upwardly from the face of the die 109, as illustrated in Fig. 14, to displace the loop portion 110 of the hinge from the arcuate recess 115 formed in the die 109. The bell crank levers 112 are returned to their inoperative positions by means of the tension springs 122.

The method of forming and applying hinges to record cards by means of the apparatus heretofore described in connection with the drawings, comprises progressively cutting portions from opposite sides of a thin strip of metal to form flange portions 79 at spaced intervals along one edge of the strip and sets of prongs 48 at spaced intervals along the other edge of the strip, then bending the flanges and prongs at right angles to the plane of the strip to provide a connected chain of partially formed hinge elements 100, then severing a hinge element 100 from the end of the chain of hinge elements, then pressing the prongs 48 of the severed hinge element 100 through a record card R and, at the same time, forming the flange 79 of the severed hinge element into a loop 110 disposed for abutting engagement against the edge of the record card, and then bending the prongs 48 at right angles toward the loop 110 to secure the hinge H to the record card. When a hinge has been formed and applied to a record card in the manner herein set forth, it will be noted that the edge of the record card is disposed within the converging recess defined between the body of the hinge and the loop 110 while the prongs 48 act to maintain the edge of the record card against the inner face of the hinge body, as illustrated in Fig. 20.

In forming and applying hinges to record cards, it is contemplated that a strip of thin metal may be blanked and formed to provide a connected chain of partially formed hinge elements 100 which may be sold to a customer to be applied, as needed, to record cards and the like by means of a simple forming and attaching device embodying the structure illustrated in Figs. 10 to 14 in the drawings. It is further contemplated that a separate device for severing, forming and applying the hinge elements 100 to record cards could be manually operated by the customer.

While this invention has been shown in but one form, it is obvious to those skilled in the art that it is not so limited but is susceptible of various changes and modifications without departing from the spirit and scope of the claimed invention.

I claim as my invention:

1. In an apparatus for forming hinges embodying loop and prong portions and for securing the hinges to record cards, a base, a plurality of die blocks secured on said base, a drive shaft journaled on said base, a feed mechanism to move a strip of metal step-by-step along said die blocks, means on said drive shaft to actuate said feed mechanism, a punch block mounted for reciprocative movement on said base, a rocker arm pivotally mounted on said base with one end thereof in slidable abutting engagement with said punch block, the other end of said arm being engaged by a cam secured on said drive shaft, blanking and forming punches mounted on said punch block to coact with said die blocks to form flanges and prongs on said strip, a shearing punch mounted for reciprocative movement on said base to cut a hinge element from said strip and to form its flange into a loop, a second rocker arm pivotally mounted on said base with one end thereof engaging said shearing punch, the other end of said second rocker arm being engaged by a second cam secured on said drive shaft, a prong bending arm coacting with said shearing punch to bend the prongs of the severed hinge element upwardly adjacent said loop, and means operable responsive to rotation of said drive shaft to actuate said prong bending arm.

2. In an apparatus for forming hinges embodying loop and prong portions and for securing the hinges to record cards, a base, a plurality of die blocks secured on said base, a drive shaft journaled on said base, a feed mechanism to move a strip of metal step-by-step along said die blocks, means on said drive shaft to actuate said feed mechanism, a punch block mounted for reciprocative movement on said base, a rocker arm pivotally mounted on said base with one end thereof in slidable abutting engagement with said punch block, the other end of said arm being engaged by a cam secured on said drive shaft, blanking and forming punches mounted on said punch block to coact with said die blocks to form flanges and prongs on said strip, a shearing punch mounted for reciprocative movement on said base to cut a hinge element from said strip and to form its flange into a loop, a second rocker arm pivotally mounted on said base with one end thereof engaging said shearing punch, the other end of said second rocker arm being engaged by a second cam secured on said drive shaft, a prong bending arm coacting with said shearing punch to bend the prongs of the severed hinge element upwardly adjacent said loop, means operable responsive to rotation of said drive shaft to actuate said prong bending arm, said means including a rocker arm pivotally mounted on said base with one end thereof connected to said prong bending arm, the other end of said rocker arm being engaged by a cam secured on said drive shaft.

3. In an apparatus for forming hinges embodying loop and prong portions and for securing the hinges to record cards, a base, a plurality of die blocks secured on said base, a drive shaft journaled on said base, a feed mechanism to move a strip of metal step-by-step along said die blocks, means on said drive shaft to actuate said feed mechanism, a punch block mounted for reciprocative movement on said base, a rocker arm pivotally mounted on said base with one end thereof in slidable abutting engagement with said punch block, the other end of said arm being engaged by a cam secured on said drive shaft, blanking and forming punches mounted on said punch block to coact with said die blocks to form flanges and prongs on said strip, a shearing punch mounted for reciprocative movement on said base to cut a hinge element from said strip and to form its flange into a loop, a second rocker arm pivotally mounted on said base with one end thereof engaging said shearing punch, the other end of said second rocker arm being engaged by a second cam secured on said drive shaft, a prong bending arm coacting with said shearing punch to bend the prongs of the severed hinge element upwardly adjacent said loop, means operable responsive to rotation of said drive shaft to actuate said prong bending arm, said means comprising a third cam secured to said drive shaft, a third rocker arm pivotally mounted on said base with one end thereof engaged by said third cam, the other end of said third rocker arm engaging one end of a connecting link, the other end of said connecting link being engaged to an actuating rod mounted for reciprocative movement and connected to said prong bending arm.

4. In an apparatus for forming hinges embodying loop and prong portions and for securing the hinges to record cards, a base, a plurality of die blocks secured on said base, a drive shaft journaled on said base, a feed mechanism to move a strip of metal step-by-step along said die blocks, means on said drive shaft to actuate said feed mechanism, a punch block mounted for reciprocative movement on said base, a rocker arm pivotally mounted on said base with one end thereof in slidable abutting engagement with said punch block, the other end of said arm being engaged by a cam secured on said drive shaft, blanking and forming punches mounted on said punch block to coact with said die blocks to form flanges and prongs on said strip, a shearing punch mounted for reciprocative movement on said base to cut a hinge element from said strip and to form its flange into a loop, a second rocker arm pivotally mounted on said base with one end thereof engaging said shearing punch, the other end of said second rocker arm being engaged by a second cam secured on said drive shaft, a prong bending arm coacting with said shearing punch to bend the prongs of the severed hinge element upwardly adjacent said loop, means operable responsive to rotation of said drive shaft to actuate said prong bending arm, resilient means yieldably resisting movement of said punch block toward said die blocks.

5. In an apparatus for forming hinges embodying loop and prong portions and for securing the hinges to record cards, a base, a plurality of die blocks secured on said base, a drive shaft journaled on said base, a feed mechanism to move a strip of metal step-by-step along said die blocks, means on said drive shaft to actuate said feed mechanism, a punch block mounted for reciprocative movement on said base, a rocker arm pivotally mounted on said base with one end thereof in slidable abutting engagement with said punch block, the other end of said arm being engaged by a cam secured on said drive shaft, blanking and forming punches mounted on said punch block to coact with said die blocks to form flanges and prongs on said strip, a shearing punch mounted for reciprocative movement on said base to cut a hinge element from said strip and to form its flange into a loop, a second rocker arm pivotally mounted on said base with one end thereof engaging said shearing punch, the other end of said second rocker arm being engaged by a second cam secured on said drive shaft, a prong bending arm coacting with said shearing punch to bend the prongs of the severed hinge element upwardly adjacent said loop, means operable responsive to rotation of said drive shaft to actuate said prong bending arm, resilient means yieldably resisting movement of said punch block toward said die blocks, resilient means yieldably resisting movement of said shearing punch toward said die blocks.

6. In an apparatus for successively severing a hinge element with a prong thereon from a chain of interconnected hinge elements and for securing the severed hinge elements to cards, a base, a track extending along said base to guide and support the chain of inserts, one end of said track having a transverse cutting edge, a die block secured on said base adjacent and below said cutting edge to support a card, a shearing punch mounted for reciprocative movement on said base to coact with said cutting edge to sever a hinge element from the chain of hinge elements and then to press the prong on the severed hinge element through a card mounted on the die block and then to clamp the severed hinge element and said card against said die block, a prong bending arm on said die block operative to bend said prong upwardly against the lower surface of said card while the card and hinge element are clamped between said punch and die block, and means operative to actuate said punch and prong bending arm.

7. In an apparatus for successively severing a hinge element with a prong thereon from a chain of interconnected hinge elements and for securing the severed hinge elements to cards, a base, a track extending along said base to guide and support the chain of inserts, one end of said track having a transverse cutting edge, a die block secured on said base adjacent and below said cutting edge to support a card, a shearing punch mounted for reciprocative movement on said base to coact first with said cutting edge to sever a hinge element from the chain of hinge elements and then to press the prong on the severed hinge element through a card mounted on the die block and then to clamp the severed hinge element and said card against said die block, a prong bending arm on said die block operative to bend said prong upwardly against the lower surface of said card while the card and hinge element are clamped between said punch and die block, said die block having an arcuate recess to receive and form one end of the severed hinge element into a closed loop responsive to movement of said punch toward said die block, and means operative to actuate said punch and prong bending arm relative to said die block.

References Cited in the file of this patent

UNITED STATES PATENTS

| Number | Name | Date |
|---|---|---|
| 1,357,319 | Hadaway | Nov. 2, 1920 |
| 1,565,523 | Stuart | Dec. 15, 1925 |
| 1,760,046 | Dixon | May 27, 1930 |
| 1,784,142 | Hosking | Dec. 9, 1930 |
| 1,870,364 | Jones | Aug. 9, 1932 |
| 1,873,125 | Holmes et al. | Aug. 23, 1932 |
| 1,944,251 | Mansbendel | Jan. 23, 1934 |
| 1,976,929 | Elliott | Oct. 16, 1934 |
| 1,984,350 | Halsey et al. | Dec. 11, 1934 |
| 2,003,448 | Kruse | June 4, 1935 |
| 2,024,416 | Allison | Dec. 17, 1935 |
| 2,083,279 | Quisling | June 8, 1937 |
| 2,102,031 | Reiter | Dec. 14, 1937 |
| 2,183,169 | Prentice | Dec. 12, 1939 |
| 2,231,286 | Firing | Feb. 11, 1941 |
| 2,252,202 | Ralston et al. | Aug. 12, 1941 |
| 2,254,117 | Keller | Aug. 26, 1941 |
| 2,299,936 | Smith | Oct. 27, 1942 |
| 2,389,699 | Stuebing, Jr. | Nov. 27, 1945 |
| 2,409,147 | Neuhaus | Oct. 8, 1946 |
| 2,409,966 | Voity et al. | Oct. 22, 1946 |
| 2,495,009 | Kiessling | Jan. 17, 1950 |